June 5, 1956  R. M. ORR  2,748,459
DIFFERENTIAL HOUSING CRADLE
Filed Aug. 17, 1954  2 Sheets-Sheet 1
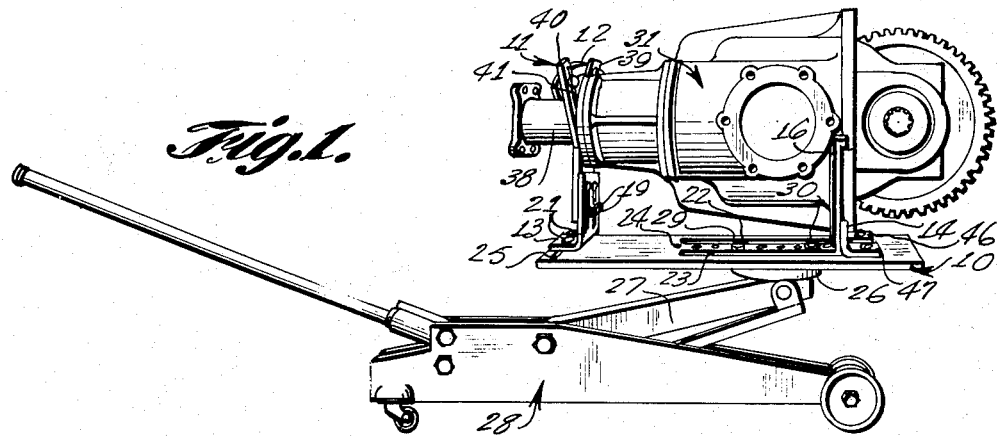
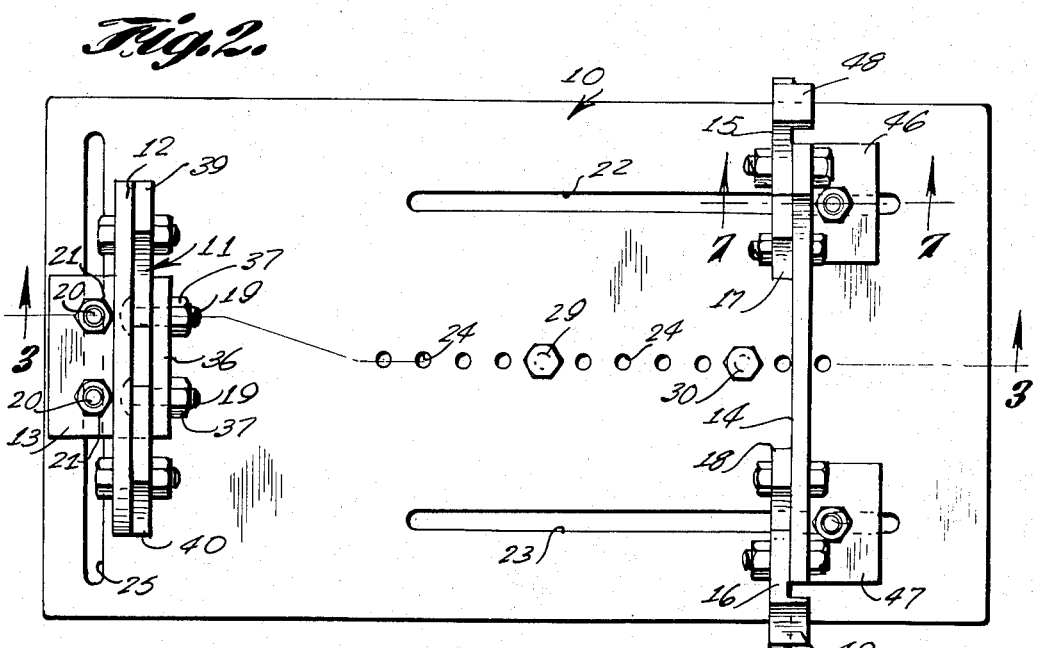
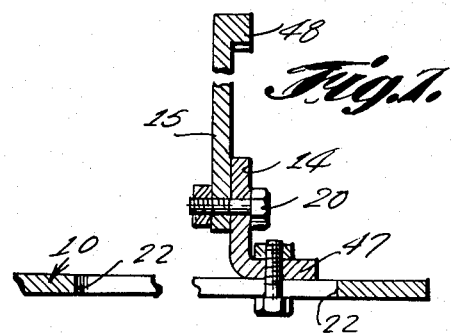
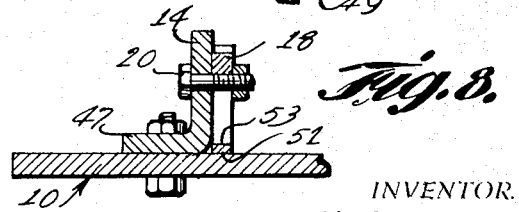
INVENTOR.
Rufus M. Orr
BY Victor J. Evans & Co.
ATTORNEYS June 5, 1956  R. M. ORR  2,748,459
DIFFERENTIAL HOUSING CRADLE
Filed Aug. 17, 1954  2 Sheets-Sheet 2
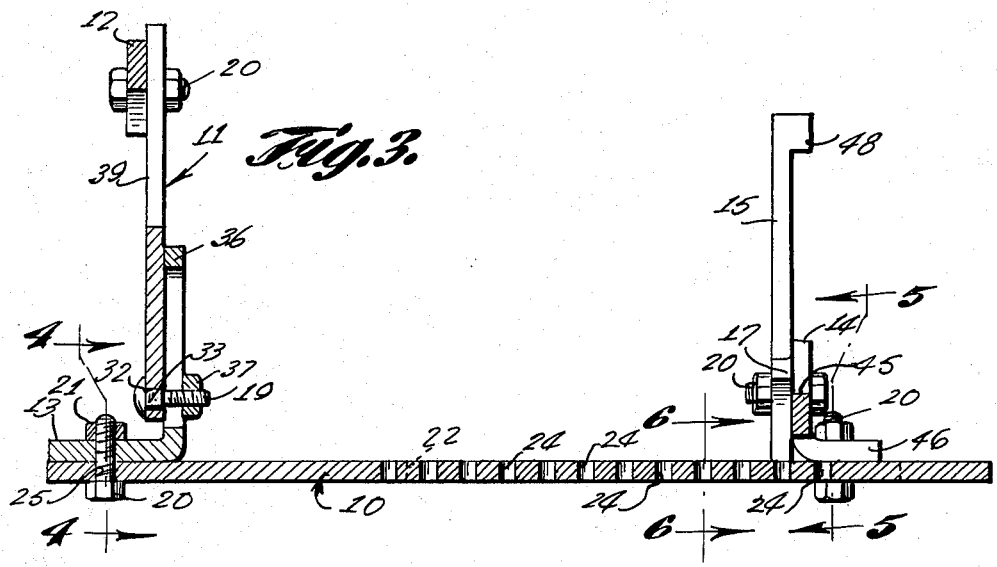
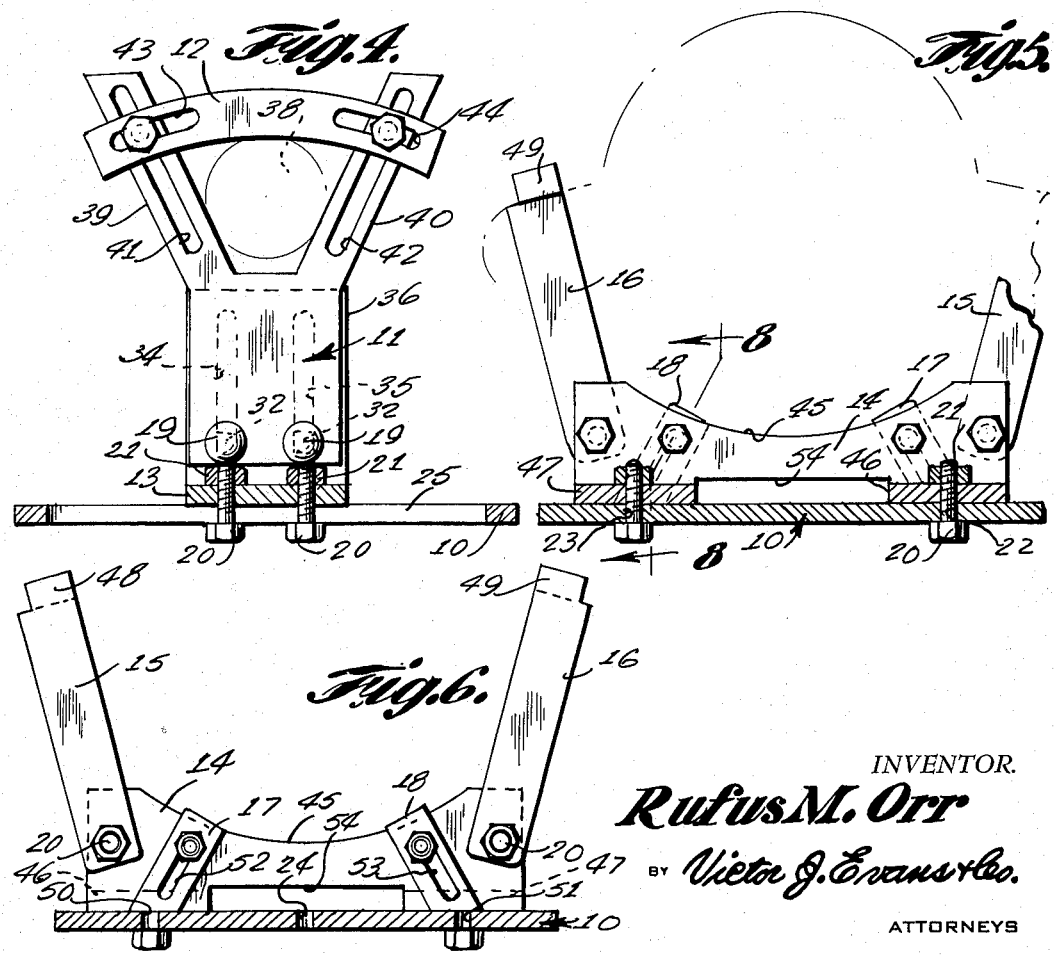
INVENTOR.
*Rufus M. Orr*
BY *Victor J. Evans & Co.*
ATTORNEYS

United States Patent Office 2,748,459
Patented June 5, 1956

2,748,459

DIFFERENTIAL HOUSING CRADLE

Rufus M. Orr, Oklahoma City, Okla.

Application August 17, 1954, Serial No. 450,483

3 Claims. (Cl. 29—284)

This invention relates to motor vehicle jacks of the type adapted to be rolled under an axle of a motor vehicle and operated from an extended handle, and in particular, a jack mounted on wheels and in the form of a dolly with a base plate having openings therethrough bolted to a platform on the lift arm of a jack and having parts such as elements of a jig including a pinion flange fork, a base for the pinion flange fork and a cradle bar with lugs and upright adjusting holding bars bolted thereto, secured, in adjusted positions, such as by bolts extended through openings therethrough thereon.

The purpose of this invention is to provide a workholding cradle in the form of a dolly or hand truck with which one mechanic may remove a differential housing from a truck, perform work on the housing, and return the housing to its position in the rear end of the truck without the assistance of other mechanics.

Owing to the weight of the conventional differential housing, particularly of a large motor truck, it is difficult to remove the bolts and take the housing out without the use of several jacks, a hoist or other tools and without the assistance of several mechanics. This operation is relatively costly and requires considerable time.

With this through in mind, this invention contemplates a plate, such as a pipe-bending plate, or jig, having elements bolted in different positions thereon, whereby the positions of the elements may be changed to correspond with flanges and other parts of differential housings of different designs and sizes so that with the plate positioned on the head of a hydraulic jack or platform of an arm of a jack the elements bolted on the plate may be positioned to receive the differential housing whereby the differential housing is rigidly supported on the plate and may be rolled away from the rear axle housing or chassis of the vehicle and supported in a convenient position to permit repairs being made thereto and, after being repaired, the housing is adapted to be rolled back into its position and secured in the rear axle housing and chassis with bolts and the like.

The object of this invention is, therefore, to provide a device, in the form of a jig, with which a differential housing or other part of a motor vehicle may be bolted to the platform or head of a jack whereby the housing is adapted to be lowered, rolled to a convenient position for making repairs thereon and returned to its position in the chassis of the vehicle without being removed from the mounting element.

Another object of the invention is to provide a cradle in the form of a dolly in which elements are provided on the cradle for securing a differential housing, transmission or other part of a vehicle to the cradle without changing parts of the housing, or device.

A further object of the invention is to provide a cradle including a mouting or base plate with attaching elements thereon whereby the third member or rear end, such as the differential housing of a truck, may be carried by a jack to facilitate removing the differential, making repairs thereto and returning the same to its position in the vehicle in which the attaching device is of a simple and economical construction.

Wtih these and other objects and advantages in view, the invention embodies a base plate adapted to be bolted to a head or platform of a jack with L-shaped attaching elements, such as clip angles adapted to be bolted thereto, and with attaching elements such as a pinion flange fork, a pinion flange hold-down bar, a base for the pinion flange fork, a cradle bar, lugs attached to the cradle bar and upright adjustign holding bars which are also adapted to be bolted to the cradle bar secured to the attaching elements.

Other features and advantages of the invention will appear from the following description taken in connection with the drawings, wherein:

Figure 1 is a perspective view illustrating the use of the differential housing cradle showing the device with the differential housing securing thereto and mounted on a platform of a lift arm of a jack.

Figure 2 is a plan view of the cradle with the parts positioned as shown on Figure 1.

Figure 3 is a longitudinal section through the cradle tatken on line 3—3 of Figure 2.

Figure 4 is a cross section through one end of the cradle taken on line 4—4 of Figure 3 showing the pinion flange fork extended upwardly from the base plate and bolted in a slot in the base plate.

Figure 5 is a cross section through the end of the cradle opposite to that shown in Figure 4 taken on line 5—5 of Figure 3 and showing, in particular, the cradle bar, upright adjusting holding bars and lugs.

Figure 6 is a cross section through the cradle taken on line 6—6 of Figure 3 also showing the cradle bar, upright adjustable holding bars and lugs.

Figure 7 is a detail showing a section taken on line 7—7 of Figure 2 showing the means for connecting the cradle bar to the base plate and the upright adjustable holding bars to the cradle bar.

Figure 8 is a detail showing a section taken on line 8—8 of Figure 5 illustrating the connection of one of the lugs to the cradle bar.

Referring now to the drawings wherein like reference characters denote corresponding parts, the improved differential housing cradle of this invention includes a mounting plate 10, a pinion flange fork 11, a pinion flange hold-down bar 12, a base for the pinion flange fork, as indicated by the numeral 13, a cradle bar 14, upright adjustable holding bars 15 and 16, lugs 17 and 18, carriage bolts 19 for clamping the pinion flange fork 11 to the base 13, and bolts 20 having nuts 21 thereon for temporarily securing the parts in adjusted positions.

As illustrated in Figures 2 and 3, the base plate 10 is provided with longitudinally disposed slots 22 and 23, a longitudinally disposed row of openings 24, and a transversely disposed slot 25. With this arrangement of openings in the plate, the plate is adapted to be mounted upon a platform 26 of a lift arm 27 of a jack 28 with bolts 29 and 30 and, with the base or mounting plate 10 in position on the platform or head of the jack, the jack may be rolled under a rear axle or other part of a vehicle and the elements secured to the base plate and positioned to engage parts of the housing, which is indicated by the numeral 31, whereby all bolts connecting the housing to the rear axle and drive shaft housing may be removed whereby with the drive shaft and axle sections disconnected the entire differential housing unit is adapted to be moved away on the dolly or jack.

For this use a pinion flange fork base is secured by bolts to the plate 10 with the bolts extended through the slot 25 and the lower portion of the pinion flange fork is held by the carriage bolts 19, square shanks 32 of which are secured in openings 33 in the pinion flange fork and the threaded ends of the bolts, which extend through slots 34 and 35 in a vertically disposed section 36 of the base 13 secured with nuts 37. With the pinion flange fork mounted in this manner, the elevation thereof is readily adjusted to compensate for variations in the elevation of a sleeve 38 extended from the pinion flange whereby the sleeve nests snugly in angularly disposed arms 39 and 40, and the sleeve is adapted to be clamped between the arms by the hold-down bar 12, as illustrated in Figure 4.

The arms 39 and 40 of the pinion flange fork are provided with elongated slots 41 and 42, respectively, and the bar 12, which is also provided with slots, as indicated by the numerals 43 and 44, is adapted to be bolted in adjusted positions on the arms 39 and 40.

The crade bar 14 which is formed with an arcuate upper surface 45 is provided with right angularly disposed flanges 46 and 47 which are positioned upon the upper surface of the base plate 10 and bolts extended through the flanges are positioned in the slots 22 and 23, respectively, of the base.

The upper ends of the upright adjustable holding bars 15 and 16, which are bolted to ends of the cradle bar 14, are provided with lugs 48 and 49 that are positioned to extend over parts of a differential housing, as shown in Figure 1, for clamping the housing to the base plate. The bars 15 and 16 may readily be adjusted or set to different angles.

The lugs 17 and 18, which are provided with beveled surfaces 50 and 51 on their lower ends, are also provided with elongated slots 52 and 53 through which the lugs are bolted to the cradle bar 14, as shown particularly in Figure 8. The intermediate portion of the lower edge of the cradle bar 14 is provided with a gap 54 whereby the cradle bar is supported, only at the ends.

With the parts designed and assembled in this manner, a dolly or cradle is provided that is adaptable to be inserted below a differential or transmission housing of a motor vehicle and particularly a truck whereby the housing is adapted to be secured to the base plate or platform with the platform elevated to take the load of the complete housing and with the housing positioned upon the base plate or platform all connections to parts of the housing and axles and shafts therein may be disconnected whereby the housing in its entirety may be transported to a shop or point where parts thereof may be readily repaired.

It will be understood that the parts may be connected to the base plate in different positions and the parts may be modified to correspond with different types of housings. Furthermore, it is not necessary to use all of the parts for some installations and in other cases it may be necessary to add additional bolts, bars or other connecting elements.

It will be understood that other modifications, within the scope of the appended claims, may be made in the design and arrangement of parts without departing from the spirit of the invention.

What is claimed is:

1. A differential housing cradle comprising a plate adapted to be secured to the platform of a lift arm of a jack, said plate having spaced openings positioned on a line extended longitudinally thereof and located midway between the edges, parallel slots also extended longitudinally of the plate and spaced from the edges thereof and a transversely disposed slot extended from one end, a pinion flange fork including a lower section with upwardly extended diverging arms having elongated slots therein positioned perpendicular to said base plate, a base for the pinion flange fork adjustably attached to the lower portion of said fork, means for securing the base of the pinion flange fork to the base plate, a cradle bar having a concave upper edge and also positioned perpendicular to the face of the base plate, said cradle bar having horizontally disposed flanges at the ends through which the cradle bar is bolted to the base plate, lugs removably attached to the cradle bar, and upright adjustable folding bars bolted to the ends of said cradle bar.

2. A differential housing cradle comprising a plate adapted to be secured to the platform of a lift arm of a jack, said plate having spaced openings positioned on a line extended longitudinally thereof and located midway between the edges, parallel slots also extended longitudinally of the plate and spaced from the edges thereof and a transversely disposed slot extended from one end, a pinion flange fork including a lower section with upwardly extended diverging arms having elongated slots therein positioned perpendicular to said base plate, a base for the pinion flange fork adjustably attached to the lower portion of said fork, means for securing the base of the pinion flange fork to the base plate, an arcuate hold-down bar having elongated slots in the ends secured by bolts extended through said slots and also through slots in the arms of the pinion flange fork, a cradle bar having a concave upper edge and also positioned perpendicular to the face of the base plate, said cradle bar having horizontally disposed flanges at the ends through which the cradle bar is bolted to the base plate, lugs removably attached to the cradle bar, and upright adjustable folding bars bolted to the ends of said cradle bar.

3. In a differential housing cradle, the combination which comprises a base plate having spaced openings positioned on a medial line extended longitudinally of said base plate, longitudinally disposed slots spaced from the edges thereof and a transversely disposed slot spaced from one end, a pinion flange fork having a base with diverging upwardly extended slotted arms positioned in a plane perpendicular to the base plate, an L-shaped base for supporting the pinion flange fork, said L-shaped base having spaced vertically disposed slots therein with bolts extended through the lower part of the pinion flange fork and positioned in the slots of the base thereof, an arcuate hold-down bar having elongated slots in the end secured by bolts to the upwardly diverging arms of the pinion flange fork with the bolts extended through the slots of the arcuate hold-down bar and also through the slots of the diverging arms, a transversely disposed cradle bar having a concave upper edge, said cradle bar also having flanges extended from the ends, bolts extended through the flanges of the cradle bar and also through the base plate for clamping the cradle bar to the base plate, angularly disposed lugs secured by bolts to the cradle bar and upright adjustable holding bars having lugs on the upper ends bolted to the ends of said cradle bar.

References Cited in the file of this patent

UNITED STATES PATENTS

| | | |
|---|---|---|
| 1,389,233 | Wert | Aug. 30, 1921 |
| 2,359,249 | Scheer | Sept. 26, 1944 |
| 2,493,295 | Kron | Jan. 3, 1950 |
| 2,514,095 | Schrieber | July 4, 1950 |
| 2,680,287 | Wilson | June 8, 1954 |